US011071155B2

(12) United States Patent
Baghel et al.

(10) Patent No.: US 11,071,155 B2
(45) Date of Patent: Jul. 20, 2021

(54) RATE CONTROL OF DEVICE-TO-DEVICE BASED RELAY COMMUNICATION

(71) Applicant: QUALCOMM Incorporated, San Diego, CA (US)

(72) Inventors: Sudhir Kumar Baghel, Bridgewater, NJ (US); Kapil Gulati, Dover, DE (US); Shailesh Patil, Raritan, NJ (US); Zhibin Wu, Bedminster, NJ (US); Hua Chen, Berkely Heights, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 15/360,531

(22) Filed: Nov. 23, 2016

(65) Prior Publication Data

US 2017/0208638 A1 Jul. 20, 2017

Related U.S. Application Data

(60) Provisional application No. 62/280,831, filed on Jan. 20, 2016.

(51) Int. Cl.
*H04W 76/14* (2018.01)
*H04W 40/22* (2009.01)
(Continued)

(52) U.S. Cl.
CPC .......... *H04W 76/14* (2018.02); *H04B 7/0413* (2013.01); *H04B 7/0632* (2013.01);
(Continued)

(58) Field of Classification Search
CPC ... H04W 76/14; H04W 52/383; H04W 52/46; H04W 52/04; H04W 52/10; H04W 40/22;
(Continued)

(56) References Cited

U.S. PATENT DOCUMENTS

2005/0220068 A1* 10/2005 Kim ........................ H04J 3/245
370/345
2009/0016271 A1 1/2009 Li et al.
(Continued)

FOREIGN PATENT DOCUMENTS

| CN | 103354993 A | 10/2013 |
|---|---|---|
| CN | 105074650 A | 11/2015 |
| WO | 2015026200 A1 | 2/2015 |

OTHER PUBLICATIONS

International Search Report and Written Opinion—PCT/US2016/063826—ISA/EPO—dated Feb. 14, 2017.

*Primary Examiner* — Mounir Moutaouakil
(74) *Attorney, Agent, or Firm* — Procopio, Cory, Hargreaves & Savitch LLP—Qualcomm

(57) ABSTRACT

In one aspect of the disclosure, to improve the performance of device-to-device based relay communication, a method, a computer-readable medium, and an apparatus for performing rate control based on feedback from participating UEs are provided. The apparatus may be a first UE. The first UE may receive a signal from a second UE through a device-to-device communication channel. The first UE may determine a feedback based on the received signal. The first UE may transmit the feedback to adjust transmission of the signal at the second UE. In another aspect of the disclosure, a first UE may transmit a signal to a second UE through a device-to-device communication channel. The first UE may receive a feedback of the signal. The first UE may adjust transmission of the signal based on the feedback.

30 Claims, 10 Drawing Sheets

Device-to-Device Communications System

(51) Int. Cl.
*H04W 52/10* (2009.01)
*H04L 1/00* (2006.01)
*H04B 17/318* (2015.01)
*H04B 7/0413* (2017.01)
*H04B 7/06* (2006.01)
*H04W 52/04* (2009.01)
*H04W 52/46* (2009.01)
*H04W 52/38* (2009.01)

(52) U.S. Cl.
CPC ......... *H04B 17/318* (2015.01); *H04L 1/0003* (2013.01); *H04L 1/0025* (2013.01); *H04L 1/0026* (2013.01); *H04W 40/22* (2013.01); *H04W 52/04* (2013.01); *H04W 52/10* (2013.01); *H04W 52/383* (2013.01); *H04W 52/46* (2013.01); *H04L 1/0009* (2013.01); *H04L 1/0027* (2013.01); *H04L 2001/0097* (2013.01)

(58) Field of Classification Search
CPC ... H04L 1/0025; H04L 1/0026; H04L 1/0003; H04L 1/0027; H04L 2001/0097; H04L 1/0009; H04B 7/0413; H04B 17/318; H04B 7/0632
See application file for complete search history.

(56) References Cited

U.S. PATENT DOCUMENTS

| | | | |
|---|---|---|---|
| 2010/0261469 A1 | 10/2010 | Ribeiro et al. | |
| 2012/0155413 A1* | 6/2012 | Liu | H04L 1/1861 370/329 |
| 2012/0287875 A1* | 11/2012 | Kim | H04W 76/27 370/329 |
| 2012/0314611 A1* | 12/2012 | Baker | H04L 1/0026 370/252 |
| 2012/0320840 A1* | 12/2012 | Kim | H04L 5/001 370/329 |
| 2012/0320852 A1* | 12/2012 | Seo | H04L 5/005 370/329 |
| 2013/0078991 A1 | 3/2013 | Nam | |
| 2014/0003262 A1* | 1/2014 | He | H04W 4/70 370/252 |
| 2014/0098759 A1 | 4/2014 | Noh et al. | |
| 2014/0242995 A1* | 8/2014 | Lee | H04W 36/20 455/436 |
| 2015/0156757 A1* | 6/2015 | Kalhan | H04L 1/1607 370/330 |
| 2016/0212682 A1* | 7/2016 | Chung | H04W 76/14 |
| 2017/0202041 A1* | 7/2017 | Qin | H04L 1/16 |

* cited by examiner

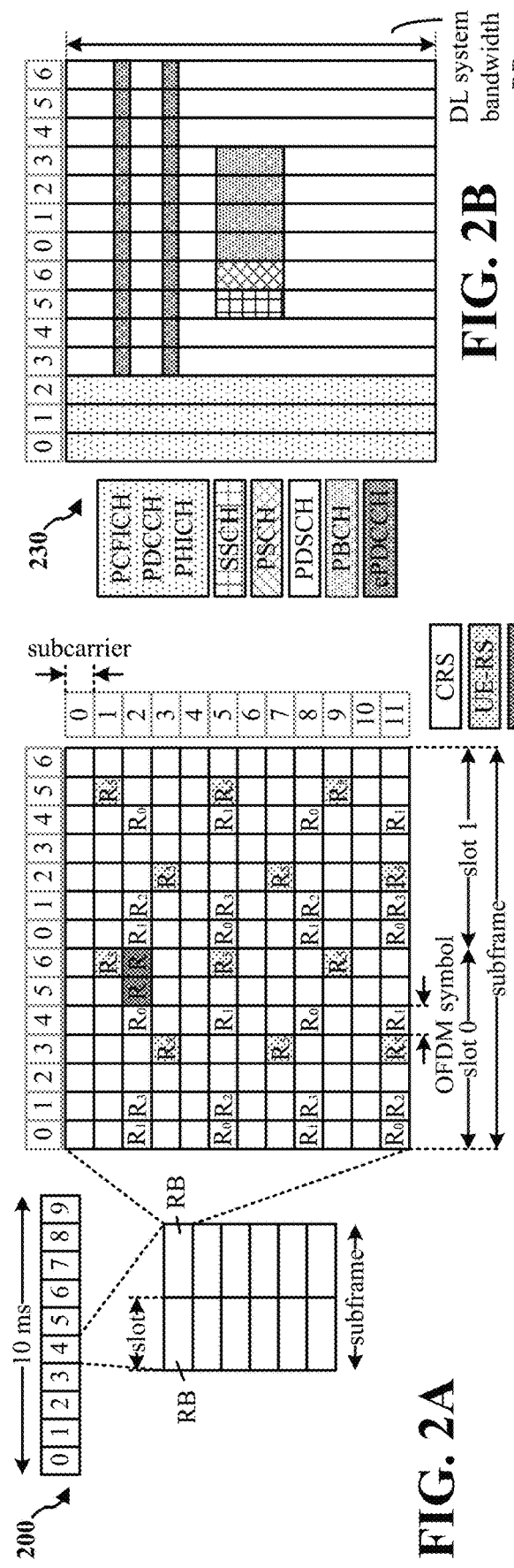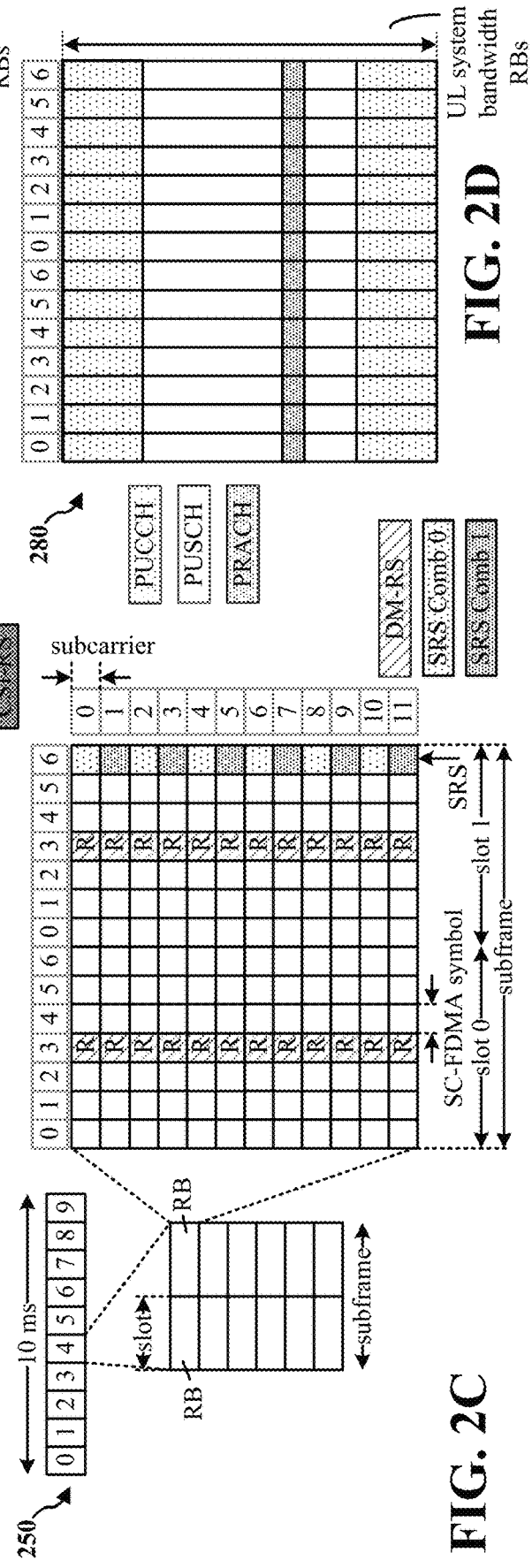

RATE CONTROL OF DEVICE-TO-DEVICE BASED RELAY COMMUNICATION

CROSS-REFERENCE TO RELATED APPLICATION(S)

This application claims the benefit of U.S. Provisional Application Ser. No. 62/280,831, entitled "RATE CONTROL OF D2D BASED RELAY COMMUNICATION" and filed on Jan. 20, 2016, which is expressly incorporated by reference herein in its entirety.

BACKGROUND

Field

The present disclosure relates generally to communication systems, and more particularly, to device-to-device (D2D) communication.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Wireless communication systems may employ a user equipment (UE) as relay to extend coverage of a base station and/or to support communications with a remote UE. The remote UE and the relay UE may utilize a D2D communication interface for communication. D2D communication may be based on a fixed number of retransmissions and the transmit power of D2D communication may be based on open loop power control with respect to the base station. D2D based relay communication does not utilize any feedback from UE to adjust the number of retransmissions and the transmit power, thus may not be efficient.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Wireless communication systems may employ a UE as relay to extend coverage of a base station and/or to support communications with a remote UE. The remote UE and the relay UE may utilize a D2D communication interface for communication. D2D communication may be based on a fixed number of retransmissions and the transmit power of D2D communication may be based on open loop power control with respect to base station. D2D based relay communication does not utilize any feedback from UE to adjust the number of retransmissions and the transmit power. In order to improve the performance of D2D based relay communication, it may be desirable to perform rate control of D2D based relay communication based on feedback from participating UEs.

In an aspect of the disclosure, a method, a computer-readable medium, and an apparatus for wireless communication are provided. The apparatus may be a first UE. The first UE may receive a signal from a second UE through a D2D communication channel. The first UE may determine a feedback based on the received signal. And the first UE may transmit the feedback to adjust transmission of the signal at the second UE.

In another aspect of the disclosure, a method, a computer-readable medium, and an apparatus for wireless communication are provided. The apparatus may be a first UE. The first UE may transmit a signal to a second UE through a D2D communication channel. The first UE may receive a feedback of the signal. The first UE may adjust transmission of the signal based on the feedback.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
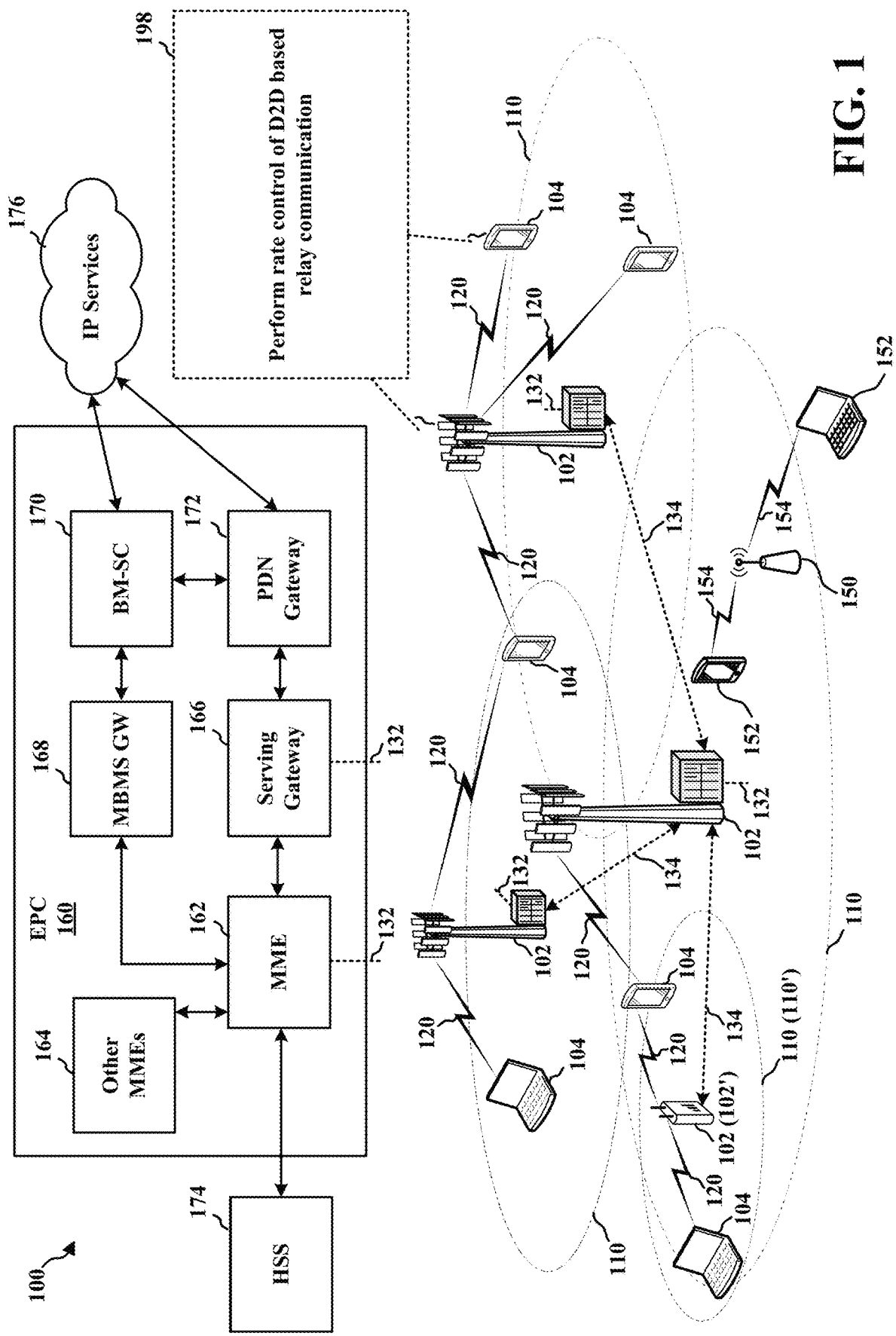
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/eNB 102 may be configured to perform (198) rate control of D2D based relay communication. Details of the operations performed at 198 are described below with reference to FIGS. 2-10.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
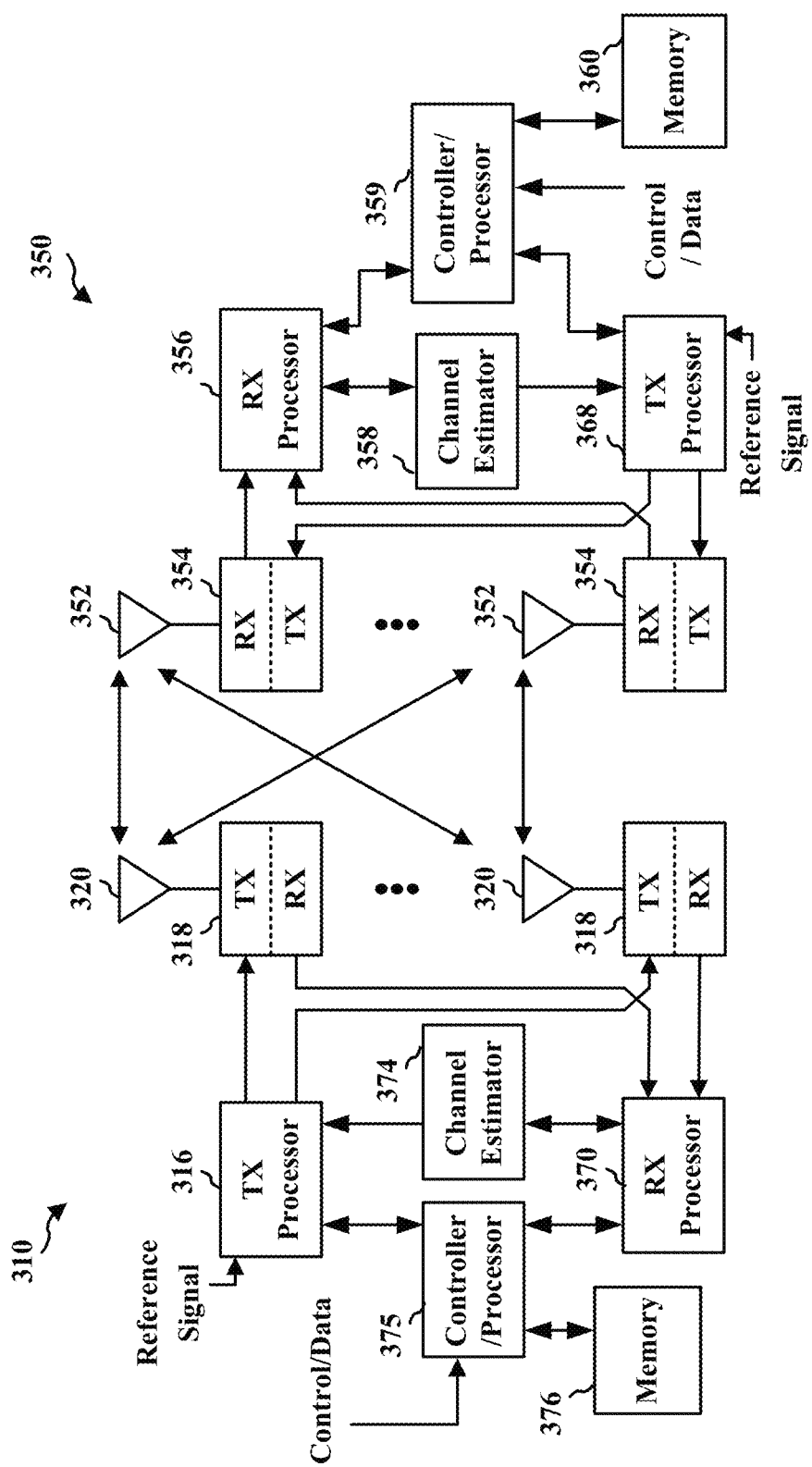
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
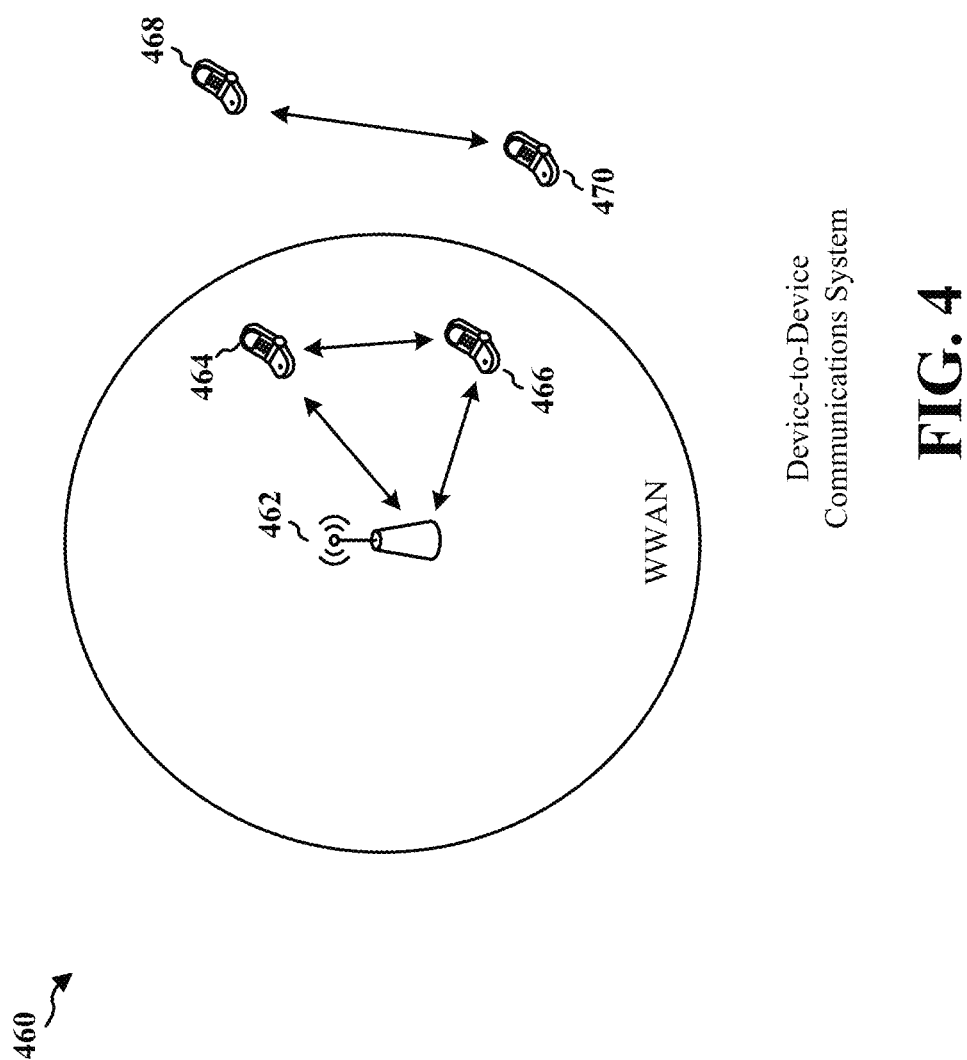
FIG. 4 is a diagram of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Wireless communication systems may employ one or more UEs as relay to extend coverage of one or more eNBs and/or to support communications with a number of remote UEs. For example, the relay UEs can facilitate communications between the eNBs and the remote UEs by relaying packets there between. In one example, the relay UEs may communicate with one or more eNBs. The relay UEs may also communicate with one or more remote UEs over device-to-device wireless access links. The goal of D2D based relay is to provide efficiency in power and resource utilization, which in turn increases system capacity. Traditional D2D communication is based on a fixed number of retransmissions and the transmit power of D2D communication is based on open loop power control with respect to eNB. Thus, D2D based relay communication does not utilize any feedback from UE to adjust the number of re-transmissions and the transmit power.

Figure 5:
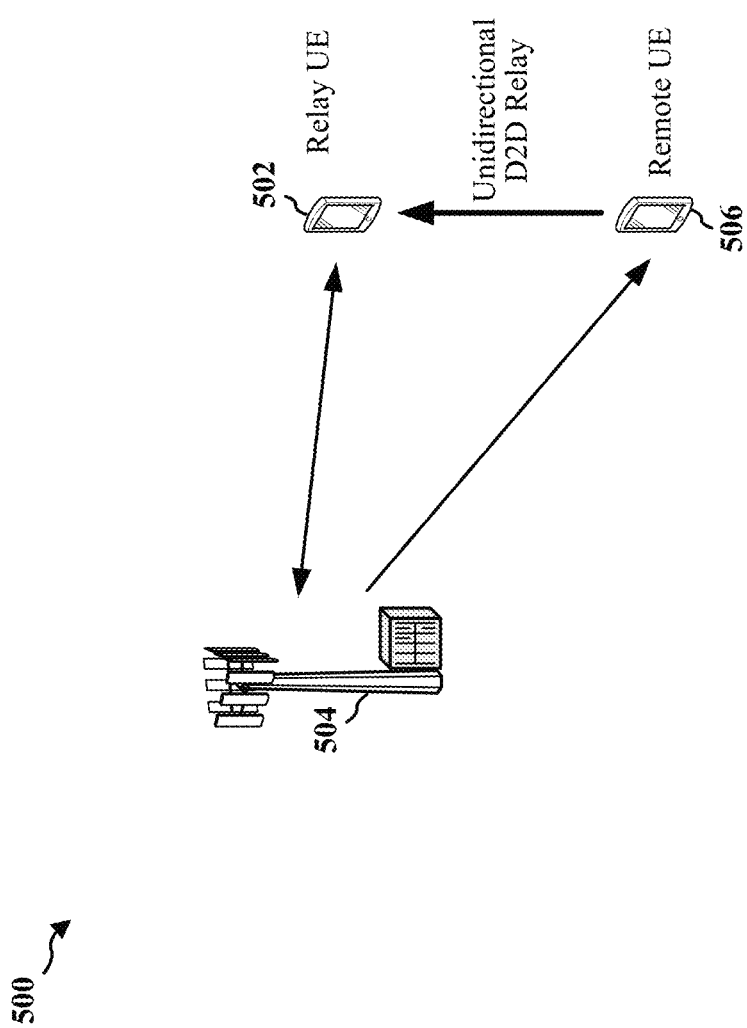
FIG. 5 is a diagram illustrating an example of rate control of D2D based unidirectional relay in a wireless communication system.

FIG. 5 is a diagram illustrating an example of rate control of D2D based unidirectional relay in a wireless communication system 500. In this example, the wireless communication system 500 includes an eNB 504, a relay UE 502, and a remote UE 506. The remote UE 506 and the relay UE 502 may utilize a D2D communication interface (e.g., PC-5) for communication. To perform unidirectional relay, the relay UE 502 may relay uplink traffic from the remote UE 506 to the eNB 504, while downlink traffic to the remote UE 506 may come from the eNB 504 directly. In one configuration, the rate control of D2D based relay may include the adjustment of one or more of the number of retransmissions at a TX UE, the transmit power at the TX UE, or the modulation and coding scheme (MCS) of the transmission based on a feedback from the RX UE. The TX UE may be either the relay UE 502 or the remote UE 506, and the RX UE may be either the remote UE 506 or the relay UE 502, respectively.

In one configuration, for configuring the initial D2D transmit power, the remote UE 506 may send a D2D discovery message (e.g., a PC5-D message) to the relay UE 502. In one configuration, the D2D discovery message may contain the transmit power for sending the D2D discovery message. Upon the reception of the discovery message, the relay UE 502 may measure the received power (e.g., sidelink discovery reference signal received power (SD-RSRP)) associated with the signal conveying the discovery message. In one configuration, the relay UE 502 may transmit the measured received power to the eNB 504 within an information message (e.g., as a part of the sidelink UE information (SLUEInfo) message). The eNB 504 may send a feedback to the remote UE 506 based on the measured received power received through the information message from the relay UE 502. In such a configuration, the measurement report containing the measured received power received by the eNB 504 may also include the layer 2 identifier (ID) of the UE to which the measurements correspond (e.g., layer 2 ID of the remote UE 506). In one alternative configuration, the relay UE 502 may send the measured received power as a feedback to the remote UE 506 directly.

In one configuration, the relay UE 502 may report the measured received power to the eNB 504, which may generate the initial transmit power control (TPC) command or initial transmit power for the remote UE 506 based on the measured received power and send the initial TPC command or initial transmit power to the remote UE 506 as a feedback to the discovery message. The remote UE 506 may adjust the transmit power based on the feedback. In another configuration, the relay UE 502 may generate the initial TPC command or initial transmit power for the remote UE 506 based on the measured received power. In such a configuration, the relay UE 502 may transmit the initial TPC command or initial transmit power directly to the remote UE 506, or to the eNB 504, which then forwards the initial TPC command or initial transmit power to the remote UE 506.

The initial TPC command or initial transmit power serves as a feedback to the discovery message. The remote UE 506 may adjust transmit power based on the feedback. In one configuration, a TPC command may be used as the feedback if the D2D discovery message does not contain the transmit power for sending the D2D discovery message, and a transmit power may be used as the feedback if the D2D discovery message contains the transmit power for sending the D2D discovery message.

In one configuration, the feedback to the D2D discovery message (e.g., the measured received power, the TPC command, or the transmit power) may be transmitted using RRC signaling or MAC control element (CE). For example, the eNB 504 may transmit the initial TPC command or initial transmit power to the remote UE 506 as a part of an RRC message. In one configuration, the relay UE 502 may transmit the feedback to the eNB 504 as a part of an MAC CE. In such configuration, the MAC CE may further include a destination index, which corresponds to a layer 2 ID of the remote UE 506 in the list of layer 2 IDs that has been shared (either by the relay UE 502 or the remote UE 506) with the eNB 504.

In one configuration, for configuring subsequent D2D transmit power, the RX UE (e.g., either the remote UE 506 or the relay UE 502) may send feedback to the TX UE via the D2D interface directly, or via a relay by the eNB 504. The feedback may include one or more of CQI, TPC, or the MCS corresponding to the TPC. In one configuration, the feedback may not include the MCS when the feedback is sent via the D2D interface. In such a configuration, the TPC included in the feedback may correspond to a MCS received by the RX UE in a scheduling assignment (SA) that is received N scheduling assignment periods or subframes before the feedback is generated and transmitted, or the TPC included in the feedback may correspond to a MCS received by the RX UE in a scheduling assignment (SA) that is received in a time window of SA periods or subframes (e.g., N1-N2) before the feedback is generated and transmitted.

In one configuration, the eNB 504 may configure, via RRC signaling (e.g., SIB or dedicated RRC messages), the RX UE (e.g., the relay UE 502 or the remote UE 506) to transmit the feedback periodically (e.g., at certain time interval or every M subframes). In one configuration, the TX UE (e.g., the relay UE 502 or the remote UE 506) may configure, via RRC signaling over the D2D interface, the RX UE to transmit the feedback periodically (e.g., at certain time interval or every M subframes). In one configuration, the TX UE (e.g., the relay UE 502 or the remote UE 506) may request the RX UE to transmit the feedback either in SA, or as a MAC CE, or via an RRC message through the D2D interface. In such a configuration, the feedback may be event-driven.

In one configuration, the feedback may be transmitted through a MAC CE or an RRC message in the D2D based unidirectional relay. For example, the relay UE 502 may transmit the feedback to the eNB 504 via a MAC CE, which may be converted to a MAC CE to be transmitted from the eNB 504 to the remote UE 506. In another example, the relay UE 502 may transmit the feedback to the eNB 504 via an RRC message, which may be converted to an RRC message to be transmitted from the eNB 504 to the remote UE 506.

In one configuration, the feedback may be transmitted by the RX UE (e.g., the relay UE 502 or the remote UE 506) only when data is received at the RX UE in a pre-configured window of N scheduling assignment periods or a certain number of configured subframes. If no data is received in the pre-configured window of N scheduling assignment periods or the certain number of configured subframes, the received UE may not transmit the feedback even if the feedback is requested or configured to be transmitted periodically. In one configuration, link adaption or rate control (e.g., adjustment of the number of retransmissions, the transmit power, or the MCS) at the TX UE (e.g., the relay UE 502 or the remote UE 506) may be performed based on the feedback from the RX UE and not performed autonomously.

Figure 6:
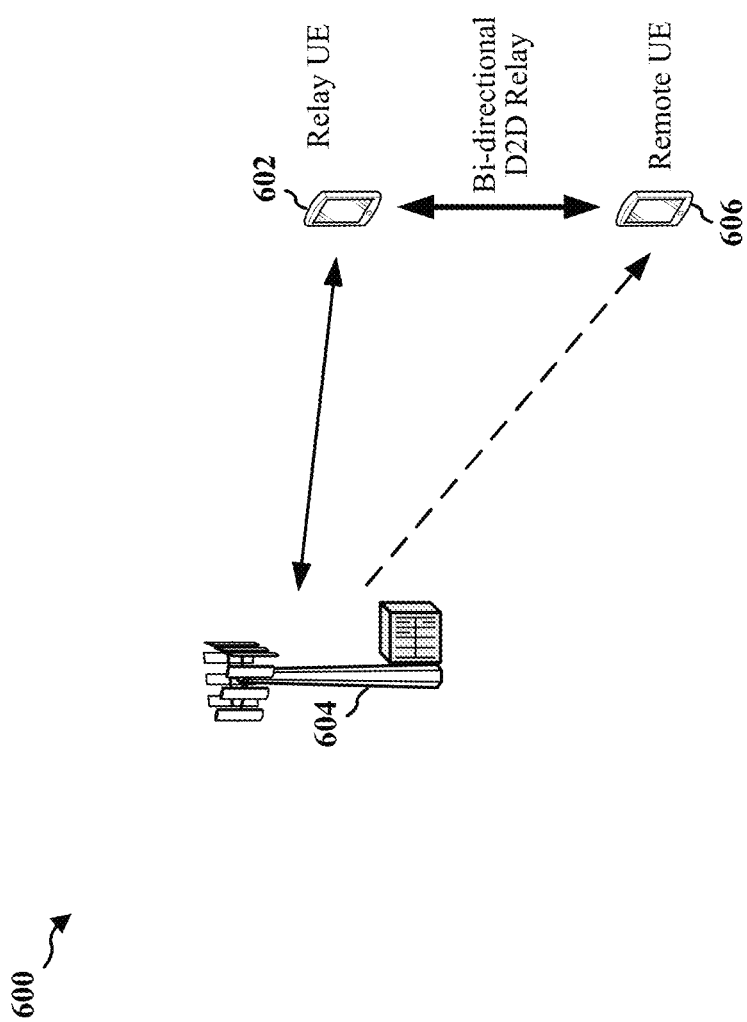
FIG. 6 is a diagram illustrating an example of rate control of D2D based bi-directional relay in a wireless communication system.

FIG. 6 is a diagram illustrating an example of rate control of D2D based bi-directional relay in a wireless communication system 600. In this example, the wireless communication system 600 includes an eNB 604, a relay UE 602, and a remote UE 606. The remote UE 606 and the relay UE 602 may utilize a D2D communication interface (e.g., PC-5) for communication. To perform bi-directional relay, the relay UE 602 relays uplink traffic from the remote UE 606 to the eNB 604 and downlink traffic from the eNB 604 to the remote UE 606. In one configuration, the eNB 604 may also send downlink traffic to the remote UE 606 directly. In one configuration, the rate control of D2D based relay may include the adjustment of one or more of the number of retransmissions at a TX UE, the transmit power at the TX UE, or the MCS of the transmission based on a feedback from the RX UE. The TX UE may be either the relay UE 602 or the remote UE 606, and the RX UE may be either the remote UE 606 or the relay UE 602, respectively.

In one configuration, for configuring the initial D2D transmit power, the remote UE 606 may send a D2D discovery message (e.g., a PC5-D message) to the relay UE 602. In one configuration, the D2D discovery message may contain the transmit power for sending the D2D discovery message. Upon the reception of the discovery message, the relay UE 602 may measure the received power (e.g., SD-RSRP) associated with the signal conveying the discovery message. In one configuration, the relay UE 602 may transmit the measured received power to the eNB 604 within an information message (e.g., as a part of the SLUEInfo message). The eNB 604 may send a feedback to the remote UE 606 based on the measured received power received through the information message. In such a configuration, the measurement report containing the measured received power received by the eNB 604 may also include the layer 2 ID of the UE to which the measurements correspond (e.g., layer 2 ID of the remote UE 606). In another configuration, the relay UE 602 may send the measured received power as a feedback to the remote UE 606 directly.

In one configuration, the relay UE 602 may report the measured received power to the eNB 604, which may generate the initial TPC command or initial transmit power for the remote UE 606 based on the measured received power and send the initial TPC command or initial transmit power to the remote UE 606 as a feedback to the discovery message. The remote UE 606 may adjust transmit power based on the feedback. In another configuration, the relay UE 602 may generate the initial TPC command or initial transmit power for the remote UE 606 based on the measured received power. In such a configuration, the relay UE 602 may transmit the initial TPC command or initial transmit power directly to the remote UE 606, or may transmit the initial TPC command or initial transmit power to the eNB 604, which may then forward the initial TPC command or initial transmit power to the remote UE 606. The initial TPC command or initial transmit power serves as a feedback to the discovery message. The remote UE 606 may adjust transmit power based on the feedback. In one configuration, a TPC command may be used as the feedback if the D2D discovery message does not contain the transmit power for sending the D2D discovery message, and a transmit power may be used as the feedback if the D2D discovery message contains the transmit power for sending the D2D discovery message.

In one configuration, the feedback to the D2D discovery message (e.g., the measured received power, the TPC command, or the transmit power) may be transmitted using RRC signaling or MAC CE. For example, the eNB 604 may transmit the initial TPC command or initial transmit power to the remote UE 606 as a part of an RRC message. In one configuration, the relay UE 602 may transmit the feedback to the eNB 604 as a part of an MAC CE. In such a configuration, the MAC CE may further include a destination index, which corresponds to a layer 2 ID of the remote UE 606 in the list of layer 2 IDs that has been shared (either by the relay UE 602 or the remote UE 606) with the eNB 604.

In one configuration, for configuring subsequent D2D transmit power, the RX UE (e.g., either the remote UE 606 or the relay UE 602) may send feedback to the TX UE via the D2D interface directly, or via a relay by the eNB 604. The feedback may include one or more of CQI, TPC, or the MCS corresponding to the TPC. In one configuration, the feedback may not include the MCS when the feedback is sent via the D2D interface. In such a configuration, the TPC included in the feedback may correspond to a MCS received by the RX UE in a scheduling assignment that is received N scheduling assignment periods or subframes before the feedback is generated and transmitted, or the TPC included in the feedback may correspond to a MCS received by the RX UE in a scheduling assignment that is received in a time window of SA periods or subframes (e.g., N1-N2) before the feedback is generated and transmitted.

In one configuration, the eNB 604 may configure, via RRC signaling (e.g., SIB or dedicated RRC messages), the RX UE (e.g., the relay UE 602 or the remote UE 606) to transmit the feedback periodically (e.g., at certain time interval or every M subframes). In one configuration, the TX UE (e.g., the relay UE 602 or the remote UE 606) may configure, via RRC signaling over the D2D interface, the RX UE to transmit the feedback periodically (e.g., at certain time interval or every M subframes). In one configuration, the TX UE (e.g., the relay UE 602 or the remote UE 606) may request the RX UE to transmit the feedback either in SA, or as a MAC CE, or via an RRC message through the D2D interface. In such a configuration, the feedback may be event-driven.

In one configuration, the feedback may be transmitted through a MAC CE, an RRC message, or a physical channel in the D2D based bi-directional relay. In one configuration, the relay UE 602 may transmit the feedback to the eNB 604 via a MAC CE, which may be converted to a MAC CE to be transmitted from the eNB 604 to the remote UE 606. In one configuration, the relay UE 602 may transmit the feedback to the remote UE 606 directly via a MAC CE over the D2D interface. In one configuration, the relay UE 602 may transmit the feedback to the eNB 604 via an RRC message, which may be converted to an RRC message to be transmitted from the eNB 604 to the remote UE 606. In one configuration, the relay UE 602 may transmit the feedback to the remote UE 606 directly via an RRC message over the D2D interface. In one configuration, the relay UE 602 may transmit the feedback to the remote UE 606 directly via a physical channel over the D2D interface.

In one configuration, the feedback may be transmitted by the RX UE (e.g., the relay UE 602 or the remote UE 606) only when data is received at the RX UE in a pre-configured window of N scheduling assignment periods or a certain number of configured subframes. If no data is received in the pre-configured window of N scheduling assignment periods or the certain number of configured subframes, the received UE may not transmit the feedback even if the feedback is requested or configured to be transmitted periodically. In one configuration, link adaption or rate control (e.g., adjustment of the number of retransmissions, the transmit power, or the MCS) at the TX UE (e.g., the relay UE 602 or the remote UE 606) may be performed based on the feedback from the RX UE and not performed autonomously.

Figure 7:
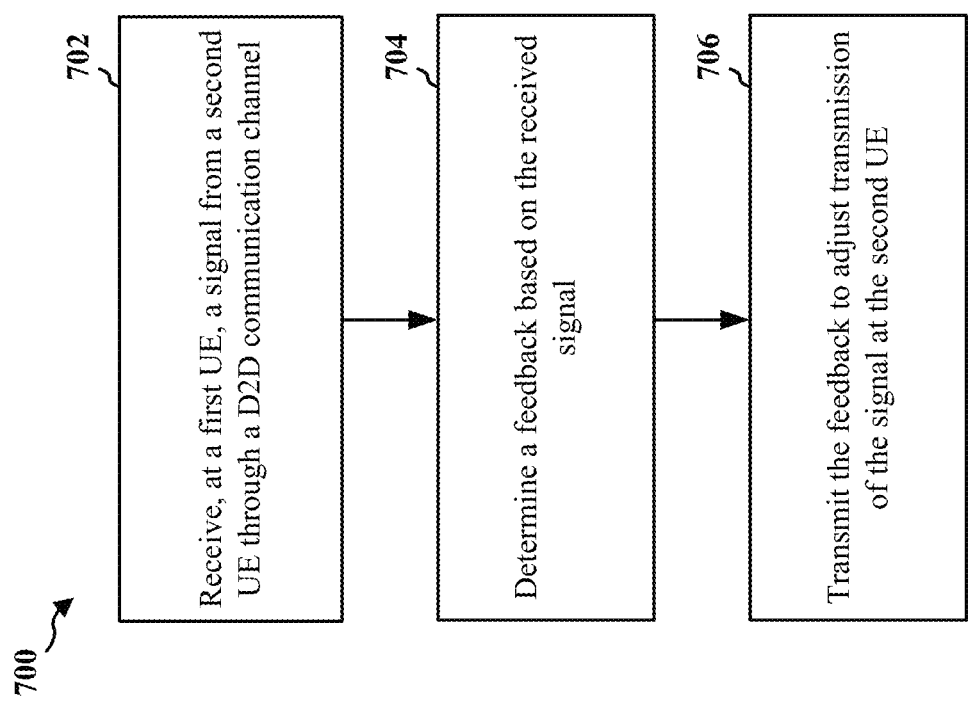
FIG. 7 is a flowchart of a method of wireless communication.

FIG. 7 is a flowchart 700 of a method of wireless communication. The method may be performed by a first UE (e.g., the UE 104, 350, 502, 506, 602, 606, or the apparatus 902/902'). In one configuration, the first UE may be a RX UE in a D2D based relay communication. At 702, the first UE may receive a signal from a second UE through a D2D communication channel. In one configuration, the D2D communication channel may use a D2D interface (e.g., PC-5). In one configuration, the signal may convey a discovery message. The first UE (e.g., 502 or 602) is to relay data received from the second UE (e.g., 506 or 606) to a base station (e.g., 504 or 604). In one configuration, the discovery message may include the transmit power for transmitting the signal.

At 704, the first UE may determine a feedback based on the received signal. In one configuration, to determine the feedback, the first UE may measure the received power (e.g., SD-RSRP) associated with the signal. In one configuration, the first UE may be configured to relay data received via the signal from the second UE to a base station. In such a configuration, the feedback may include one or more of CQI, TPC, or MCS for the TPC. In one configuration, the feedback may be sent to the second UE via a D2D communication interface and the feedback does not include the MCS. In such a configuration, the TPC contained in the feedback may correspond to the MCS received by the first UE in a SA that is received N scheduling assignment periods or subframes before the feedback is generated and transmitted, or the TPC contained in the feedback may correspond to the MCS received by the first UE in a SA that is received in a time window of SA periods or subframes before the feedback is generated and transmitted.

Finally, at 706, the first UE may transmit the feedback to adjust transmission of the signal at the second UE. In one configuration, to transmit the feedback, the first UE may transmit the measured received power within an information message (e.g., SLUEInfo message) to the base station (e.g., the eNB 504 or 604). In such a configuration, the information message may further include a layer 2 ID of the second UE. In one configuration, the base station may configure, based on the measured received power, a TPC command or a transmit power to be a part of an RRC message to be transmitted to the second UE.

In one configuration, to determine the feedback, the first UE may generate a TPC command based on the measured received power. In such a configuration, to transmit the feedback, the first UE may transmit the TPC command to the second UE or to the base station for forwarding to the second UE. In one configuration, the feedback may be transmitted to the base station as a part of an MAC CE. In such a configuration, the MAC CE may further include a destination index corresponding to a layer 2 ID of the second UE in a list of layer 2 IDs shared with the base station.

In one configuration, the feedback may be transmitted to the second UE directly or via a base station (e.g., the eNB 504 or 604). In one configuration, to adjust the transmission of the signal, the second UE may adjust at least one of the number of retransmissions, the transmit power, or the MCS of the signal. In one configuration, the feedback may be transmitted through a MAC CE, an RRC message, or a physical channel. In one configuration, the feedback may be transmitted only when data is received in a pre-configured window of N scheduling assignment periods or a certain number of configured subframes.

In one configuration, the base station may configure, through RRC signaling, the first UE to transmit the feedback periodically. In one configuration, the second UE may configure, via RRC through the D2D communication channel, the first UE to transmit the feedback periodically. In one configuration, the second UE may request the first UE to transmit the feedback either in SA, or as a MAC CE, or via an RRC message through the D2D communication channel.

Figure 8:
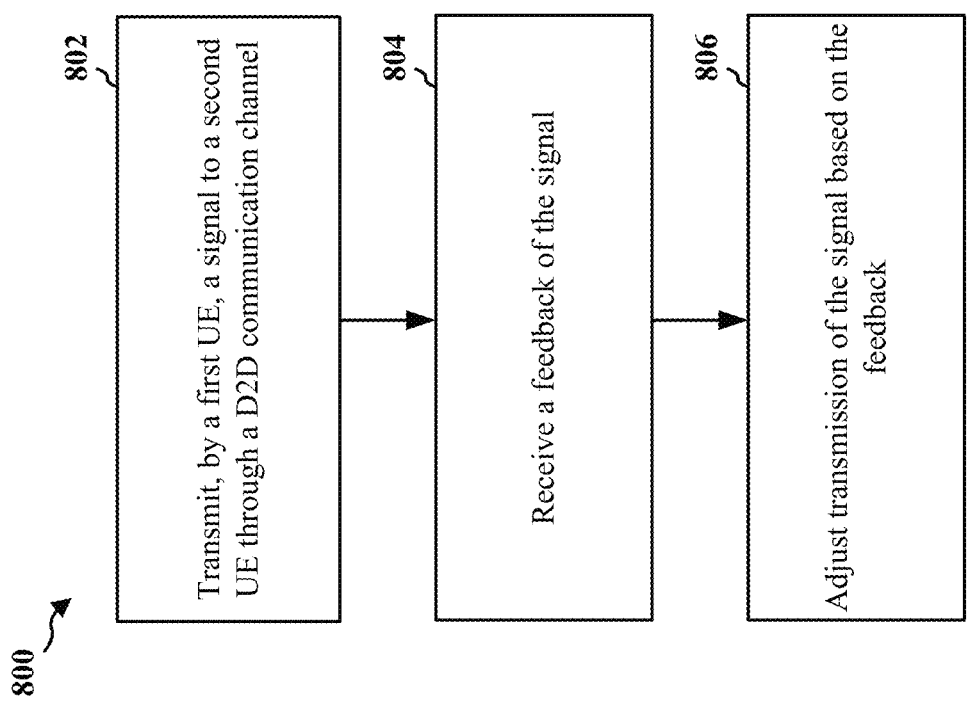
FIG. 8 is a flowchart of a method of wireless communication.

FIG. 8 is a flowchart 800 of a method of wireless communication. The method may be performed by a first UE (e.g., the UE 104, 350, 502, 506, 602, 606, or the apparatus 902/902'). In one configuration, the first UE may be a TX UE in a D2D based relay communication. At 802, the first UE may transmit a signal to a second UE through a D2D communication channel. In one configuration, the D2D communication channel may use a D2D interface (e.g., PC-5). In one configuration, the signal may convey a discovery message. The second UE (e.g., 502 or 602) is to relay data received from the first UE to a base station (e.g., 504 or 604). In one configuration, the discovery message may include the transmit power for transmitting the signal.

At 804, the first UE may receive a feedback of the signal. In one configuration, the feedback may be received from the second UE directly or via a base station (e.g., the eNB 504 or 604). In one configuration, the feedback may include a TPC command or a transmit power as a part of an RRC message or an MAC CE from the base station. In one configuration, the second UE may be configured to relay data received via the signal from the first UE to a base station. In such a configuration, the feedback may include one or more of CQI, TPC, or MCS for the TPC. In one configuration, the feedback may be received via a D2D communication interface and the feedback does not include the MCS. In such a configuration, the TPC contained in the feedback may correspond to the MCS sent by the first UE in SA that is sent N scheduling assignment periods or subframes before the feedback is received, or a time window of SA periods or subframes before the feedback is received.

Finally, at 806, the first UE may adjust transmission of the signal based on the feedback. In one configuration, to adjust the transmission of the signal, the first UE may adjust at least one of the number of retransmissions, the transmit power, or the MCS of the signal. In one configuration, the feedback may be received through a MAC CE, an RRC message, or a physical channel.

In one configuration, the base station may configure, through RRC signaling, the second UE to transmit the feedback periodically. In one configuration, the first UE may configure, via RRC through the D2D communication channel, the second UE to transmit the feedback periodically. In one configuration, the first UE may request the second UE to transmit the feedback either in SA, or as a MAC CE, or via an RRC message through the D2D communication channel.

Figure 9:
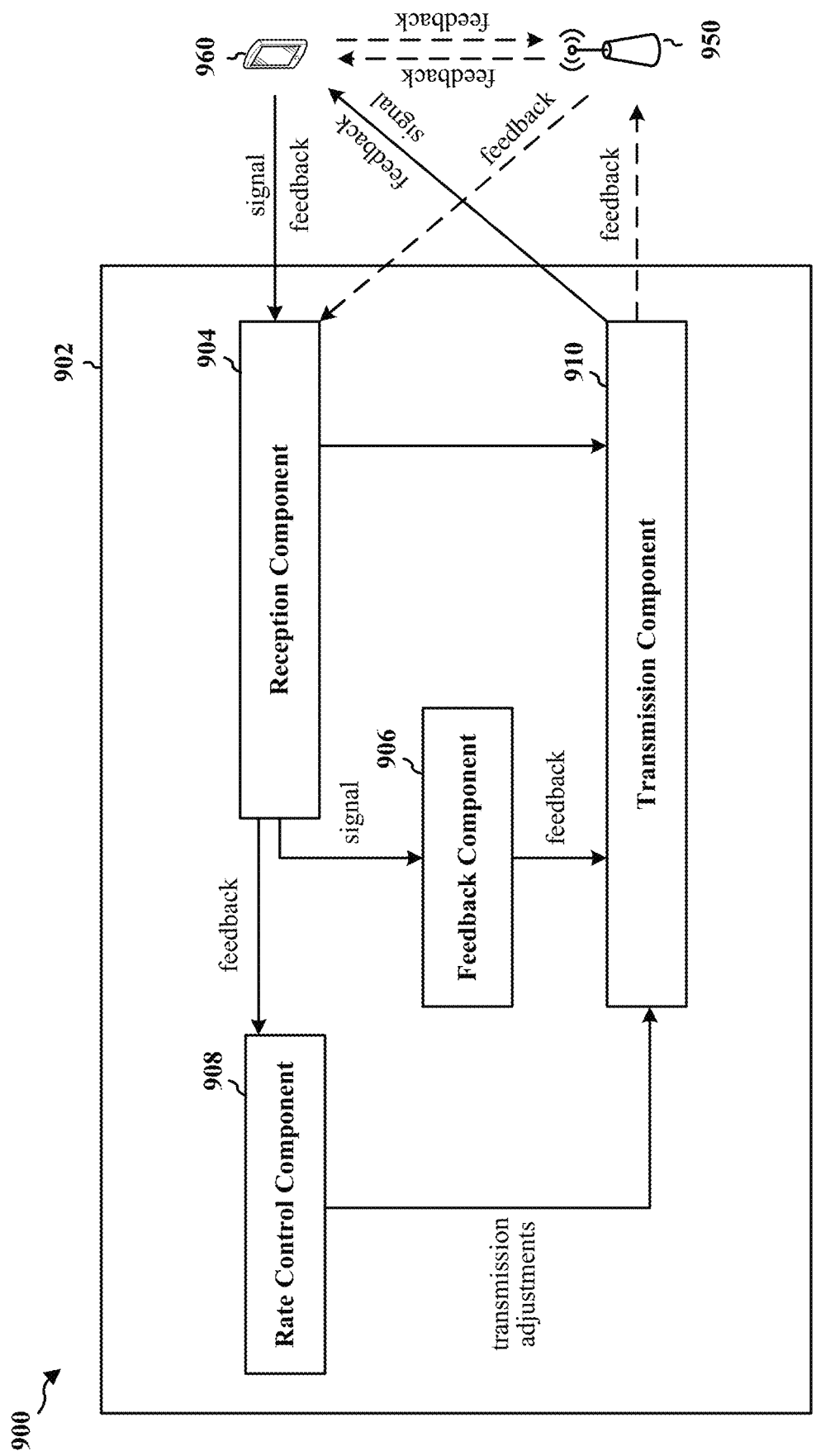
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus 902 may be a UE. The apparatus 902 may include a reception component 904 that receives a signal from a UE 960. The reception component 904 may receive a feedback regarding a signal the apparatus 902 sent to the UE 960. The reception component 904 may receive the feedback from the UE 960 directly or indirectly via an eNB 950. In one configuration, the reception component 904 may perform operations described above with reference to 702 or FIG. 7 or 804 of FIG. 8.

The apparatus 902 may include a transmission component 910 that transmits a signal to the UE 960. The transmission component 910 may transmit a feedback regarding a signal received from the UE 960. The transmission component 910 may transmit the feedback to the UE 960 directly or indirectly via the eNB 950. In one configuration, the transmission component 910 may perform operations described above with reference to 706 or FIG. 7 or 802 of FIG. 8. The reception component 904 and the transmission component 910 may work together to coordinate the communication of the apparatus 902.

The apparatus 902 may include a feedback component 906 that determines a feedback based on a signal received from the reception component 904. In one configuration, the feedback component 906 may perform operations described above with reference to 704 or FIG. 7.

The apparatus 902 may include a rate control component 908 that determines transmission adjustments for the apparatus 902 based on a feedback received from the reception component 904. In one configuration, the rate control component 908 may perform operations described above with reference to 806 or FIG. 8.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
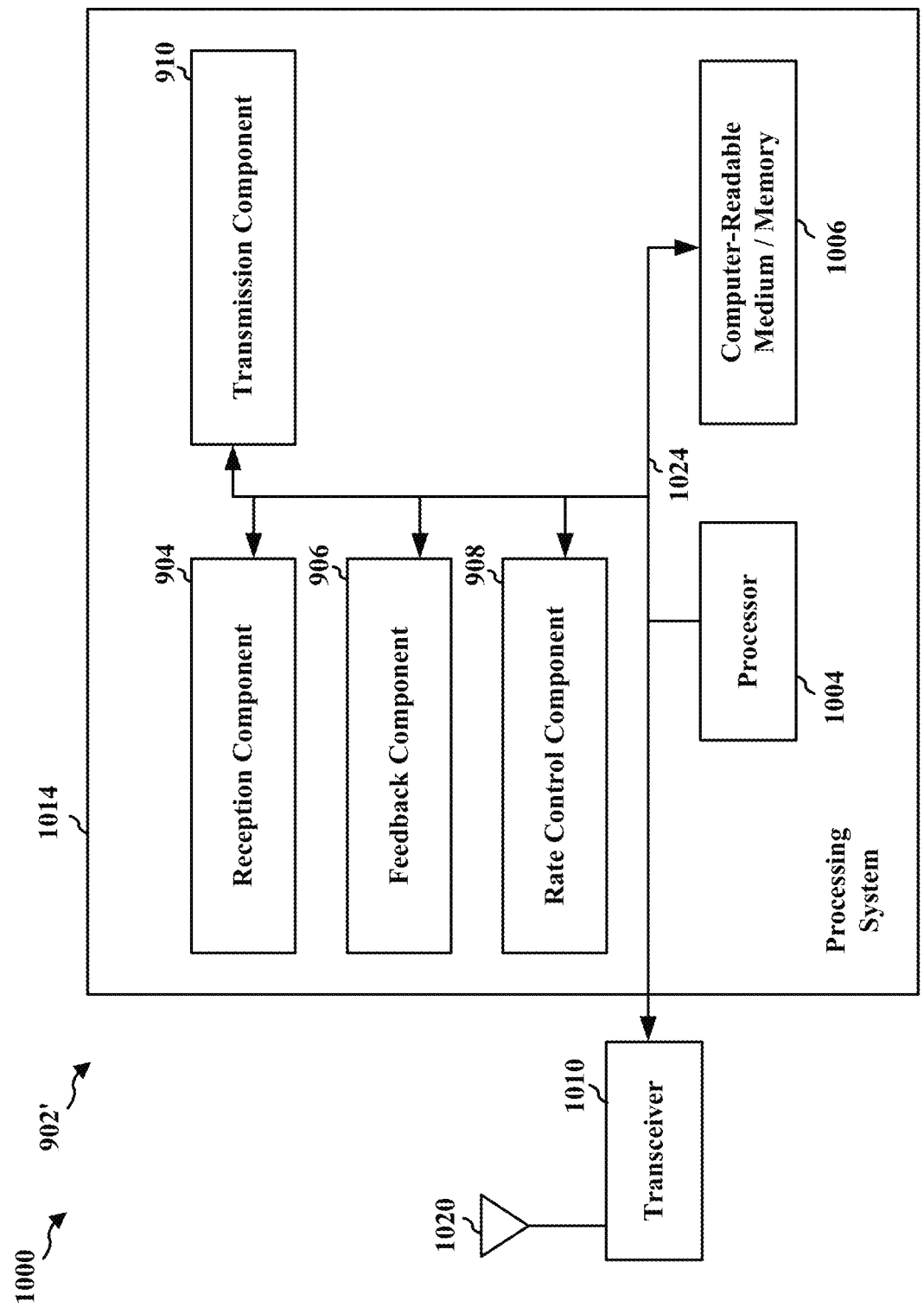
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication may include means for receiving a signal from a second UE through a D2D communication channel. In one configuration, the means for receiving a signal from a second UE through a D2D communication channel may be the transceiver 1010, the one or more antennas 1020, the reception component 904, or the processor 1004. In one configuration, the means for receiving a signal from a second UE through a D2D communication channel may perform operations described above with reference to 702 of FIG. 7.

In one configuration, the apparatus 902/902' may include means for determining a feedback based on the received signal. In one configuration, the means for determining a feedback based on the received signal may be the feedback component 906 or the processor 1004. In one configuration, the means for determining a feedback based on the received signal may perform operations described above with reference to 704 of FIG. 7. In one configuration, the means for determining the feedback may be configured to measure a received power associated with the signal.

In one configuration, the apparatus 902/902' may include means for transmitting the feedback to adjust transmission of the signal at a second UE. In one configuration, the means for transmitting the feedback to adjust transmission of the signal at a second UE may be the transceiver 1010, the one or more antennas 1020, the transmission component 910, or the processor 1004. In one configuration, the means for transmitting the feedback to adjust transmission of the signal at a second UE may perform operations described above with reference to 706 of FIG. 7. In one configuration, the means for transmitting the feedback may be configured to transmit the measured received power within an information message to the base station.

In one configuration, the means for determining the feedback may be configured to generate a TPC command based on the measured received power. In such a configuration, the means for transmitting the feedback may be configured to transmit the TPC command to a second UE or to the base station for forwarding to the second UE.

In one configuration, the apparatus 902/902' may include means for relaying data received via the signal from a second UE to a base station. In one configuration, the means for relaying data received via the signal from a second UE to a base station may be the transceiver 1010, the one or more antennas 1020, the reception component 904, the transmission component 910, or the processor 1004. In one configuration, the means for relaying data received via the signal from a second UE to a base station may be configured to extract the data from the signal received from the second UE and forward the extracted data to the base station.

In one configuration, the apparatus 902/902' may include means for transmitting a signal to a second UE through a D2D communication channel. In one configuration, the means for transmitting a signal to a second UE through a D2D communication channel may be the transceiver 1010, the one or more antennas 1020, the transmission component 910, or the processor 1004. In one configuration, the means for transmitting a signal to a second UE through a D2D communication channel may perform operations described above with reference to 802 of FIG. 8.

In one configuration, the apparatus 902/902' may include means for receiving a feedback of the signal. In one configuration, the means for receiving a feedback of the signal may be the transceiver 1010, the one or more antennas 1020, the reception component 904, or the processor 1004. In one configuration, the means for receiving a feedback of the signal may perform operations described above with reference to 804 of FIG. 8.

In one configuration, the apparatus 902/902' may include means for adjusting transmission of the signal based on the feedback. In one configuration, the means for adjusting transmission of the signal based on the feedback may be the rate control component 908 or the processor 1004. In one configuration, the means for adjusting transmission of the signal based on the feedback may perform operations described above with reference to 806 of FIG. 8. In one configuration, the means for adjusting the transmission of the signal may be configured to adjust at least one of a number of retransmissions at the apparatus 902/902', a transmit power at the apparatus 902/902', or a MCS of the signal.

In one configuration, the apparatus 902/902' may include means for configuring the second UE to transmit the feedback periodically. In one configuration, the means for configuring the second UE to transmit the feedback periodically may be the transceiver 1010, the one or more antennas 1020, the transmission component 910, or the processor 1004. In one configuration, the means for configuring the second UE to transmit the feedback periodically may be configured to configure the second UE via RRC through the D2D communication channel.

In one configuration, the apparatus 902/902' may include means for requesting the second UE to transmit the feedback. In one configuration, the means for requesting the second UE to transmit the feedback may be the transceiver 1010, the one or more antennas 1020, the transmission component 910, or the processor 1004. In one configuration, the means for requesting the second UE to transmit the feedback may be configured to send the request to the second UE either in scheduling assignment, or as a MAC CE, or via an RRC message through the D2D communication channel.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first user equipment (UE), comprising:
   receiving a signal from a second UE through a device-to-device (D2D) communication channel, wherein the signal comprises information on a transmit power used by the second UE to transmit the signal;
   receiving a message from the second UE through radio resource control (RRC), the message configuring the first UE to transmit feedback periodically based on a feedback transmission period, and the message includes the feedback transmission period, wherein the feedback transmission period is based on a number of configured subframes;
   determining a feedback based on the received signal within the number of configured subframes; and
   transmitting the feedback to adjust transmission of the signal at the second UE, wherein the first UE is configured to transmit periodic feedback based on the number of configured subframes in the feedback transmission period.

2. The method of claim 1, wherein the feedback is transmitted to the second UE to adjust at least one of a number of retransmissions at the second UE, the transmit power at the second UE, or a modulation and coding scheme (MCS) of the signal.

3. The method of claim 1, wherein the feedback is transmitted to the second UE directly or via a base station, wherein the first UE is to relay data received from the second UE to the base station.

4. The method of claim 3, wherein the determining of the feedback comprises measuring a received power associated with the signal.

5. The method of claim 4, wherein the transmitting of the feedback comprises transmitting the measured received power within an information message to the base station, wherein the information message further comprises a layer 2 ID of the second UE.

6. The method of claim 4, wherein the feedback is transmitted to the base station to configure, based on the measured received power and the received information on the transmit power, a transmit power control (TPC) command or a second transmit power to be a part of an RRC message to be transmitted to the second UE.

7. The method of claim 4, wherein the determining of the feedback comprises generating a transmit power control (TPC) command or a second transmit power based on the measured received power and the received information on the transmit power, wherein the transmitting of the feedback comprises transmitting the TPC command or the second transmit power to the second UE or to the base station for forwarding to the second UE.

8. The method of claim 3, wherein the feedback is transmitted to the base station as a part of an MAC control element (CE), wherein the MAC CE further comprises a destination index corresponding to a layer 2 ID of the second UE in a list of layer 2 IDs shared with the base station.

9. The method of claim 1, further comprising relaying data received via the signal from the second UE to a base station, wherein the feedback comprises one or more of channel quality indicator (CQI), transmit power control (TPC), or modulation and coding scheme (MCS) for the TPC.

10. The method of claim 9, wherein the feedback is sent to the second UE via a D2D communication interface and the feedback does not comprise the MCS, wherein the TPC corresponds to a MCS received by the first UE in a scheduling assignment that is received N scheduling assignment periods or subframes before the feedback is generated and transmitted, or a time window of scheduling assignment periods or subframes before the feedback is generated and transmitted.

11. The method of claim 1, wherein the first UE receives a request from the second UE to transmit the feedback either in a scheduling assignment, or as a MAC control element (CE), or via a radio resource control (RRC) message through the D2D communication channel.

12. The method of claim 1, further comprising:
   determining whether data is received at the first UE in a window of scheduling assignment periods or in the number of configured subframes;
   transmitting the feedback based on the feedback transmission period when the data is determined to be received at the first UE in the window of scheduling assignment periods or in the number of configured subframes; and determining not to transmit the feedback when the data is determined to be not received at the first UE in the window of scheduling assignment periods or in the number of configured subframes.

13. A method of wireless communication of a first user equipment (UE), comprising:

transmitting a signal to a second UE through a device-to-device (D2D) communication channel, wherein the signal comprises information on a transmit power used by the first UE to transmit the signal;

transmitting a message to the second UE through radio resource control (RRC), the message configuring the second UE to transmit feedback periodically based on a feedback transmission period, and the message includes the feedback transmission period, wherein the feedback transmission period is based on a number of configured subframes;

receiving periodic feedback of the signal based on the number of configured subframes in the feedback transmission period; and adjusting transmission of the signal based on the periodic feedback.

14. The method of claim 13, wherein the adjusting of the transmission of the signal comprises adjusting at least one of a number of retransmissions at the first UE, the transmit power at the first UE, or a modulation and coding scheme (MCS) of the signal.

15. The method of claim 13, wherein the feedback is received from the second UE directly or via a base station, wherein the second UE is to relay data received from the first UE to the base station.

16. An apparatus for wireless communication, the apparatus being a first user equipment (UE), comprising:

a memory; and at least one processor coupled to the memory and configured to:

receive a signal from a second UE through a device-to-device (D2D) communication channel, wherein the signal comprises information on a transmit power used by the second UE to transmit the signal;

receive a message from the second UE through radio resource control (RRC), the message configuring the first UE to transmit feedback periodically based on a feedback transmission period, and the message includes the feedback transmission period, wherein the feedback transmission period is based on a number of configured subframes;

determine a feedback based on the received signal within the number of configured subframes; and transmit the feedback to adjust transmission of the signal at the second UE, wherein the first UE is configured to transmit periodic feedback based on the number of configured subframes in the feedback transmission period.

17. The apparatus of claim 16, wherein the feedback is transmitted to the second UE to adjust at least one of a number of retransmissions at the second UE, the transmit power at the second UE, or a modulation and coding scheme (MCS) of the signal.

18. The apparatus of claim 16, wherein the feedback is transmitted to the second UE directly or via a base station, wherein the first UE is to relay data received from the second UE to the base station.

19. The apparatus of claim 18, wherein, to determine the feedback, the at least one processor is configured to measure a received power associated with the signal.

20. The apparatus of claim 19, wherein, to transmit the feedback, the at least one processor is configured to transmit the measured received power within an information message to the base station, wherein the information message further comprises a layer 2 ID of the second UE.

21. The apparatus of claim 19, wherein the feedback is transmitted to the base station to configure, based on the measured received power and the received information on the transmit power, a transmit power control (TPC) command or a second transmit power to be a part of an RRC message to be transmitted to the second UE.

22. The apparatus of claim 19, wherein, to determine the feedback, the at least one processor is configured to generate a transmit power control (TPC) command or a second transmit power based on the measured received power and the received information on the transmit power, wherein, to transmit the feedback, the at least one processor is configured to transmit the TPC command or the second transmit power to the second UE or to the base station for forwarding to the second UE.

23. The apparatus of claim 18, wherein the feedback is transmitted to the base station as a part of an MAC control element (CE), wherein the MAC CE further comprises a destination index corresponding to a layer 2 ID of the second UE in a list of layer 2 IDs shared with the base station.

24. The apparatus of claim 16, wherein the at least one processor is further configured to relay data received via the signal from the second UE to a base station, wherein the feedback comprises one or more of channel quality indicator (CQI), transmit power control (TPC), or modulation and coding scheme (MCS) for the TPC.

25. The apparatus of claim 24, wherein the feedback is sent to the second UE via a D2D communication interface and the feedback does not comprise the MCS, wherein the TPC corresponds to a MCS received by the first UE in a scheduling assignment that is received N scheduling assignment periods or subframes before the feedback is generated and transmitted, or a time window of scheduling assignment periods or subframes before the feedback is generated and transmitted.

26. The apparatus of claim 16, wherein the at least one processor is further configured to receive a request from the second UE to transmit the feedback either in a scheduling assignment, or as a MAC control element (CE), or via a radio resource control (RRC) message through the D2D communication channel.

27. The apparatus of claim 16, wherein the at least one processor is further configured to:

determine whether data is received at the first UE in a window of scheduling assignment periods or in the number of configured subframes;

transmit the feedback based on the feedback transmission period when the data is determined to be received at the first UE in the window of scheduling assignment periods or in the number of configured subframes; and determine not to transmit the feedback when the data is determined to be not received at the first UE in the window of scheduling assignment periods or in the number of configured subframes.

28. An apparatus for wireless communication, the apparatus being a first user equipment (UE), comprising:

a memory; and at least one processor coupled to the memory and configured to:

transmit a signal to a second UE through a device-to-device (D2D) communication channel, wherein the signal comprises information on a transmit power used by the first UE to transmit the signal;

transmit a message to the second UE through radio resource control (RRC), the message configuring the second UE to transmit feedback periodically based on a feedback transmission period, and the message includes the feedback transmission period, wherein the feedback transmission period is based on a number of configured subframes;

receive periodic feedback of the signal based on the number of configured subframes in the feedback transmission period; and adjust transmission of the signal based on the periodic feedback.

29. The apparatus of claim 28, wherein, to adjust the transmission of the signal, the at least one processor is configured to adjust at least one of a number of retransmissions at the first UE, the transmit power at the first UE, or a modulation and coding scheme (MCS) of the signal.

30. The apparatus of claim 28, wherein the feedback is received from the second UE directly or via a base station, wherein the second UE is to relay data received from the first UE to the base station.

* * * * *